(12) United States Patent
Yamada (10) Patent No.: US 7,224,832 B2
(45) Date of Patent: May 29, 2007

(54) IMAGE CODING DEVICE, AND IMAGE DECODING DEVICE USING IRREVERSABLE CODING WITHOUT MASK IMAGE

(75) Inventor: Hideaki Yamada, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 703 days.

(21) Appl. No.: 10/382,581

(22) Filed: Mar. 7, 2003

(65) Prior Publication Data

US 2003/0219159 A1  Nov. 27, 2003

(30) Foreign Application Priority Data

Mar. 8, 2002 (JP) ............................ P2002-064471

(51) Int. Cl.
*G06K 9/00* (2006.01)
*G06K 9/36* (2006.01)

(52) U.S. Cl. ..................................... 382/166
(58) Field of Classification Search ................ 382/100, 382/128, 162, 164, 166, 232, 233, 274, 276; 345/589, 613, 600–604; 348/390.1; 358/1.9, 358/3.28, 444, 523
See application file for complete search history.

(56) References Cited

U.S. PATENT DOCUMENTS 5,159,449 A * 10/1992 Allmendinger .......... 348/390.1
5,502,576 A * 3/1996 Ramsay et al. ............. 358/444
6,091,512 A * 7/2000 Sasanuma et al. ........... 358/1.9
6,539,126 B1* 3/2003 Socolinsky et al. ......... 382/274
2002/0070948 A1* 6/2002 Murai et al. ................ 345/589
2003/0219159 A1* 11/2003 Yamada ...................... 382/232
2004/0223635 A1* 11/2004 Shinbata ..................... 382/128
2004/0263911 A1* 12/2004 Rodriguez et al. ......... 358/3.28
2005/0062758 A1* 3/2005 Kaasila et al. .............. 345/613
2005/0100189 A1* 5/2005 Yamada ...................... 382/100

FOREIGN PATENT DOCUMENTS

JP         9-46517 A      2/1997
JP         9-147099 A     6/1997
JP         2000-354170    12/2000

* cited by examiner

*Primary Examiner*—Amir Alavi
(74) *Attorney, Agent, or Firm*—Birch, Stewart, Kolasch & Birch, LLP (57) ABSTRACT

An object of the invention is to provide an image coding device and an image decoding device enabling a transmitting color function through irreversible coding by performing the processing to reduce the occurrence of noises at the encoder's end without using a mask image. A grayscale shift unit shifts the grayscale of a transmitting color of an original image, after which a coding unit performs irreversible coding on the image. A transmitting color judging unit judges the transmitting color of a decoded image based on luminance information alone, and an up-sampling unit restores an outline of an object faithfully without being accompanied by deterioration in resolution resulted from the sub-sampling. It is thus possible to obtain a high-quality image with fewer noises.

13 Claims, 7 Drawing Sheets

OBJECT 4
ORIGINAL IMAGE 1
TRANSMITTING COLOR 5

FIG. 8 PRIOR ART

DECODED IMAGE 2 THROUGH IRREVERSIBLE CODING
NOISE 6

FIG. 9
PRIOR ART

MASK IMAGE 3

IMAGE CODING DEVICE, AND IMAGE DECODING DEVICE USING IRREVERSABLE CODING WITHOUT MASK IMAGE

BACKGROUND OF THE INVENTION

1. Field of the Invention

The invention relates to an image coding device and an image decoding device for compositing an object image with a background image through irreversible coding having a high compression rate, using a specific color of an image as a transmitting color.

2. Description of the Related Art

To meet the advancement of digital image processing techniques, image composition processing for compositing an input image from an image reading apparatus, such as a digital camera and a scanner, with another image to be used as a background image has been used increasingly in recent years. In a case of TV broadcasting and movies, a picture of an individual standing in front of a blue or green background is taken with a camera, then the color portion of the background in the pictured video is composited with a scene of a foreign country or the like through the use of a method called a chroma key, and a video as if the individual were in that country is thereby produced.

In the WWW browser of the Internet, an image of an outlined subject is also composited with a background image. In this case, the image composition is performed on the personal computer of the user. However, because an image to be placed on the foreground is sent from a remote server over the Internet, the image is compressed to save the transmission time. The outlined subject to be placed on the foreground is called an object and the surroundings of the object are filled with a specified transmitting color, so that the background will be visible only through the portion of the transmitting color that becomes transparent when the object and the background image are superimposed. GIF (Graphics Interchange Format) and PNG (Portable Network Graphics) are known as a standard image format that realizes the transmitting color in the above manner and comes with the WWW browser. Both of these compression methods adopt reversible compression by which an image will not change due to compression.

For a color facsimile machine, there is an optional coding method called MRC (Mixed Raster Content) that enables the image composition in the same manner as above. According to MRC, an image is divided into three layers: a fore layer, a mask layer, and a back layer, and each layer is encoded through different methods. The fore layer and the back layer are color images and the mask layer is a binary image, and which of the fore layer and the back layer is to be displayed is selected at the decoder's end.

Also, MPEG (Moving Picture Coding Experts Group)-4 used for encoding a moving image is furnished with an object-based coding function that enables the image composition in the same manner as above. According to the object-based coding, an image called an alpha plane is used separately besides an image containing an object to specify a transparent portion surrounding the object. The alpha plane includes a binary alpha plane of a binary image and a grayscale alpha plane. The grayscale alpha plane is used to specify translucence as an option, and irreversible coding is applied. The binary alpha plane is essential and reversible coding is applied.

Figure 7:
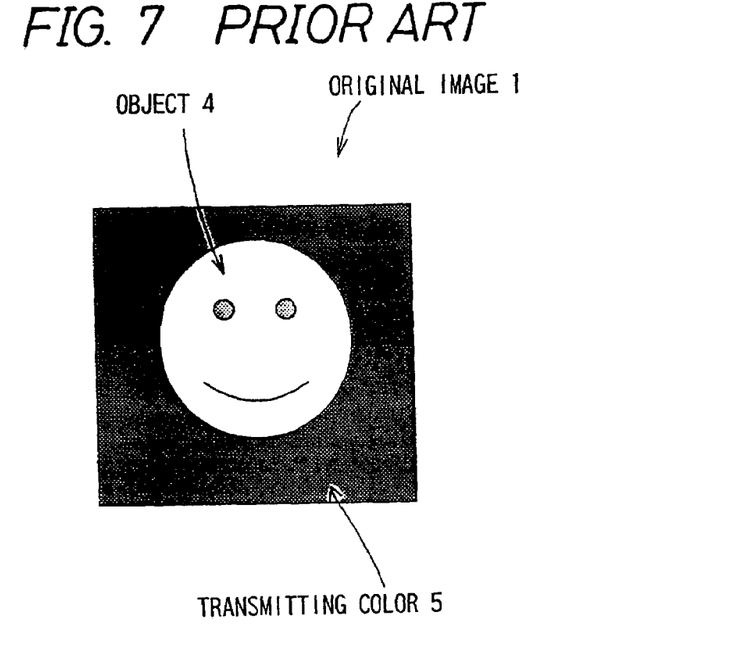
FIG. 7 is a view showing an original image with a specified transmitting color in the related art.
Figure 8:
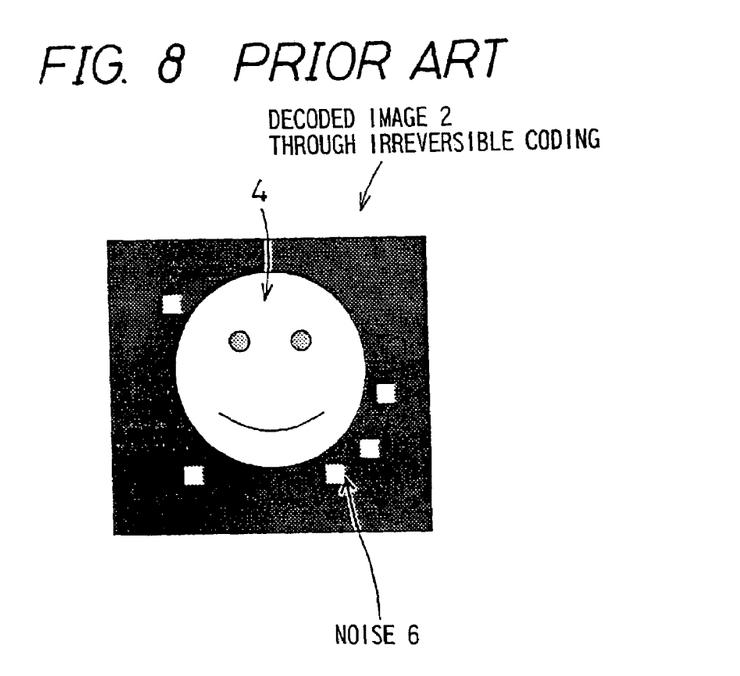
FIG. 8 is a view showing a decoded image obtained through irreversible coding in the related art.

FIG. 7 shows the original image 1 with a specified transmitting color 5, and FIG. 8 shows the decoded image 2 obtained through irreversibly coding. The reason why the related arts use the reversible coding for the image composition using a transmitting color as with GIF and PNG is as follows. That is, even when the transmitting color is specified, the pixel density is changed between a non-encoded original image 1 and a decoded image 2 in the case of irreversible coding, which causes noises particularly near the edge, and a portion other than the transmitting color portion is thereby produced in the surroundings of an object 4. Both in FIG. 7 and in FIG. 8, the gray portion represents the transmitting color. The reversible coding, however, has a problem that a compression rate is lower than that of the irreversible coding.

Figure 9:
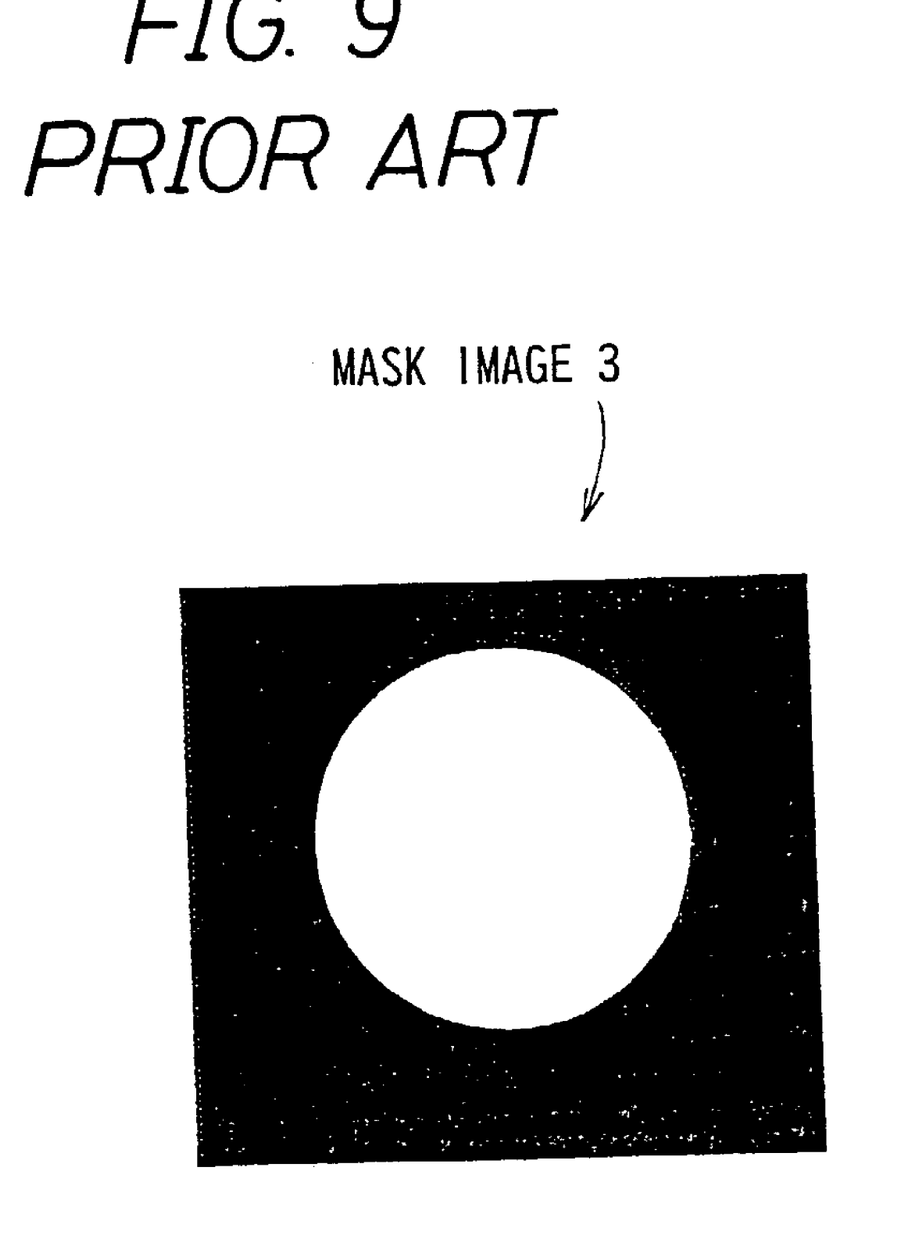
FIG. 9 is a view showing a mask image used in the related art.

In order to use the irreversible coding while avoiding the occurrence of noises 6 in the surroundings of the object 4, a mask image is used separately besides the images to be composited as with the arbitrary shape coding in MRC and MPEG-4. Of a mask image 3 of FIG. 9, a white portion specifies the display of an object and a black portion specifies the display of a background. However, although a mask image is a binary image, it has to be reversibly encoded, which increases an overall coding quantity. Moreover, the need to composite images at the decoder's end using two or more coding methods not only complicates the device, but also demands a larger memory capacity, thereby posing a problem that the manufacturing costs are increased.

Further, in many cases of irreversible coding, an image is separated into a luminance component and two color-difference components before being encoded, and sub-sampling is performed on the color-difference components. This is because the human eyes are less sensitive to a change in color difference in comparison with a spatial change in luminance. Thus, in the case of a natural image, when an individual sees an image restored to the original resolution through up-sampling at the time of decoding, he hardly notices deterioration in image quality; moreover, it is almost impossible to identify a difference between an image restored from the data on which the sub-sampling was performed and an image restored from the data on which the sub-sampling was not performed. The occurrence of noises can be suppressed by lowering the compression rate even in the irreversible coding method. However, because the resolution is deteriorated when the sub-sampling is performed, lowering the compression rate is not suitable when displaying characters, the shape of an object, etc.

SUMMARY OF THE INVENTION

Accordingly, an object of the invention is to provide an image coding device and an image decoding device enabling a transmitting color function through irreversible coding by performing the processing to reduce the occurrence of noises at the encoder's end without using a mask image.

The invention provides an image coding device, comprising: grayscale shifting means for shifting a grayscale of luminance of a transmitting color of an original image; and image coding means for irreversibly encoding the image whose grayscale has been shifted by the grayscale shifting means.

According to the invention, the grayscale of the transmitting color of an original image is shifted by the grayscale shifting means, after which irreversible coding with a high compression rate is performed. It is thus possible to encode an object with a smaller coding quantity without using a mask image. Also, because the need to use the mask image can be eliminated, the structure can be simpler, and hence the cost can be saved.

In the invention it is preferable that the grayscale shifting means uses a value representing a darkest color of black as the grayscale of luminance of the transmitting color.

In the invention it is preferable that the grayscale shifting means uses a value representing a brightest color of white as the grayscale of luminance of the transmitting color.

In the invention it is preferable that the grayscale shifting means shifts the grayscale of luminance of the transmitting color of the original image which exists within a predetermined range, to an outside thereof.

Furthermore, the invention provides an image decoding device comprising: image decoding means for decoding an encoded image; and transmitting color judging means for judging a transmitting color from luminance information of the image decoded in the image decoding means.

According to the invention, an encoded image is decoded in the image decoding means, and the transmitting color judging means judges the transmitting color of the decoded image using the luminance information alone. It is thus possible to restore and reproduce the outline of an object faithfully without being accompanied by deterioration in resolution resulted from the sub-sampling.

Further, in the invention it is preferable that the transmitting color judging means uses a value representing a darkest color of black as a grayscale of luminance judged as being the transmitting color.

Further, in the invention it is preferable that the transmitting color judging means uses a value representing a brightest color of white as a grayscale of luminance judged as being the transmitting color.

In the invention it is preferable that the image decoding means replaces, out of grayscales of luminance of the image decoded, grayscales outside a predetermined range, within the predetermined range.

Furthermore, the invention provides an image processing apparatus comprising: grayscale shifting means for shifting a grayscale of a transmitting color of an original image; image coding means for irreversibly encoding the image whose grayscale has been shifted by the grayscale shifting means; image decoding means for decoding the image encoded by the image coding means; and transmitting color judging means for judging the transmitting color from luminance of the image decoded by the image decoding means.

According to the invention, the grayscale of the transmitting color of an original image is shifted by the grayscale shifting means, after which the irreversible coding with a high compression rate is performed, and the object is thereby encoded with a smaller coding quantity without using a mask image. The image encoded in this manner is decoded, and the transmitting color judging means judges the transmitting color of the decoded image based on the luminance information alone. The outline of the object is thus restored faithfully without being accompanied by deterioration in resolution resulted from the sub-sampling, thereby making it possible to obtain a high-quality image with fewer noises. Also, because the need to use the mask image can be eliminated, the arrangement can be simpler, and hence the cost can be saved.

Further, in the invention it is preferable that the grayscale shifting means uses a value representing a darkest color of black as the grayscale of luminance of the transmitting color, and the transmitting color judging means uses the value representing the darkest color of black as the grayscale of luminance judged as being the transmitting color.

Further, in the invention it is preferable that the grayscale shifting means uses a value representing a brightest color of white as the grayscale of luminance of the transmitting color, and the transmitting color judging means uses the value representing the brightest color of white as the grayscale of luminance judged as being the transmitting color.

Further, in the invention it is preferable that the transmitting color judging means uses only luminance in judging the transmitting color, and uses a value representing a darkest color of black as the grayscale of luminance judged as being the transmitting color.

Further, in the invention it is preferable that the transmitting color judging means uses only luminance in judging the transmitting color, and uses a value representing a brightest color of white as the grayscale of luminance judged as being the transmitting color.

In the invention it is preferable that the grayscale shifting means shifts the grayscale of luminance of the transmitting color of the original image which exists within a predetermined range, to an outside thereof, and that the image decoding means replaces, out of grayscales of luminance of the image decoded, grayscales outside a predetermined range, within the predetermined range.

According to the invention, an object image can be encoded at a low cost by suppressing the occurrence of the noises in a transmitting color portion without using a mask image needed in the related arts. Because the transmitting color is judged based on the luminance alone, the outline of the object can be reproduced faithfully without being accompanied by deterioration in resolution resulted from the sub-sampling, thereby making it possible to obtain a high-quality image. Further, by using the value representing the darkest color of black or the value representing the brightest color of white as the grayscale of luminance judged as being the transmitting color, it is possible to use the value with reference to which noises were eliminated through clipping as the transmitting color. Hence, should noises occur in a color-difference image, the transmitting color can be still judged correctly.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Now referring to the drawings, preferred embodiments of the invention are described below.

Figure 1:
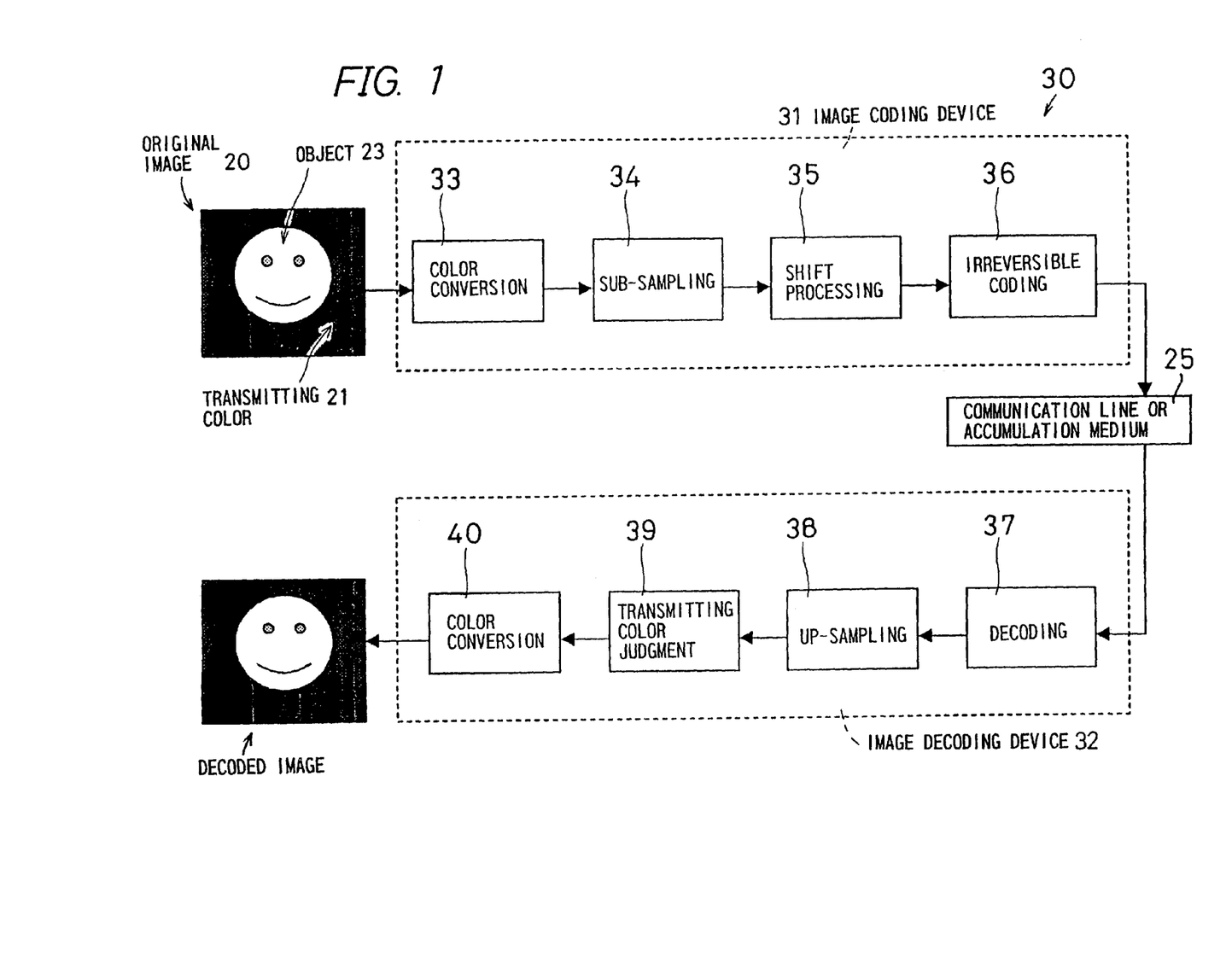
FIG. 1 is a block diagram showing an image processing apparatus according to one embodiment of the invention.

FIG. 1 is a block diagram showing an image processing apparatus 30 according one embodiment of the invention. The image processing apparatus 30 of this embodiment includes an image coding device 31 and an image decoding device 32. The image coding device 31 includes a color converting unit 33, a sub-sampling unit 34, a shift processing unit 35 as grayscale shifting means, and an irreversible coding unit 36 as image encoding means. Also, the image decoding device 32 includes a decoding unit 37 as image decoding means, an up-sampling unit 38, a transmitting color judging unit 39 as transmitting color judging means, and a color converting unit 40.

In the image coding device 31, the color converting unit 33 converts a color space of an original image 20 using, for example, the RGB representation, into luminance and two color differences. As a color space represented by the luminance and the color differences, a YCbCr color space is used for a digital camera and a TV camera, and a CIELAB color space is used for a color facsimile machine. The color representation system of a color space differs depending on an application program installed in each machine. However, the invention is not addressed to an essential difference, and it is therefore sufficient to use a color converting method of the International Standards.

The sub-sampling unit 34 leaves the resolution of luminance intact and lowers the resolution of the color differences. As a method of sampling, a method of sampling pixels both vertically and horizontally to assign a color difference to four luminance pixels, or a method of sampling pixels only horizontally to assign one color-difference pixel to two luminance pixels is adopted. The sampling method may adopt an averaging method instead of using the skipping method alone.

To be more specific, assume that the grayscale is represented by 0 to R−1, then the grayscale of luminance of a transmitting color in a transmitting color portion 21 surrounding an object 23 is either 0 or R−1. Herein, R is an integer, and R=256 for 8-bit data. In regard to an image 20 inputted into the image coding device 31, assume that a range of the transmitting color is determined in advance, and the transmitting color portion 21 is also determined in advance to be either white or black. Given R=256 and white is the transmitting color, then 255 is given to each of RGB, and a value of the luminance after the color conversion is also 255. When black is the transmitting color, 0 is given to each of RGB, and the value of the luminance is also 0. The shift processing unit 35 shifts the grayscale to a negative value for the transmitting color having the luminance 0, and to a value equal to or greater than R for the transmitting color having the luminance R−1.

The principle based on which the noises in the transmitting color are reduced by the shift will now be explained. Given R as the grayscale, then a pixel value is an integer value from 0 to R−1. Generally, 256 is often given to R, which is a value for 8-bit data, and this value is also adopted in this embodiment. The pixel value (R=256) is inputted when the coding is performed. However, in the case of irreversible conversion coding, such as JPEG and JPEG2000, an error occurs due to frequency conversion and quantization, and for this reason, the pixel value may go outside the grayscale range when the image is decoded. In this case, the decoding unit 37 performs clipping processing to return the pixel value outside the range to a boundary value, that is, 0 or R−1.

Figure 2:
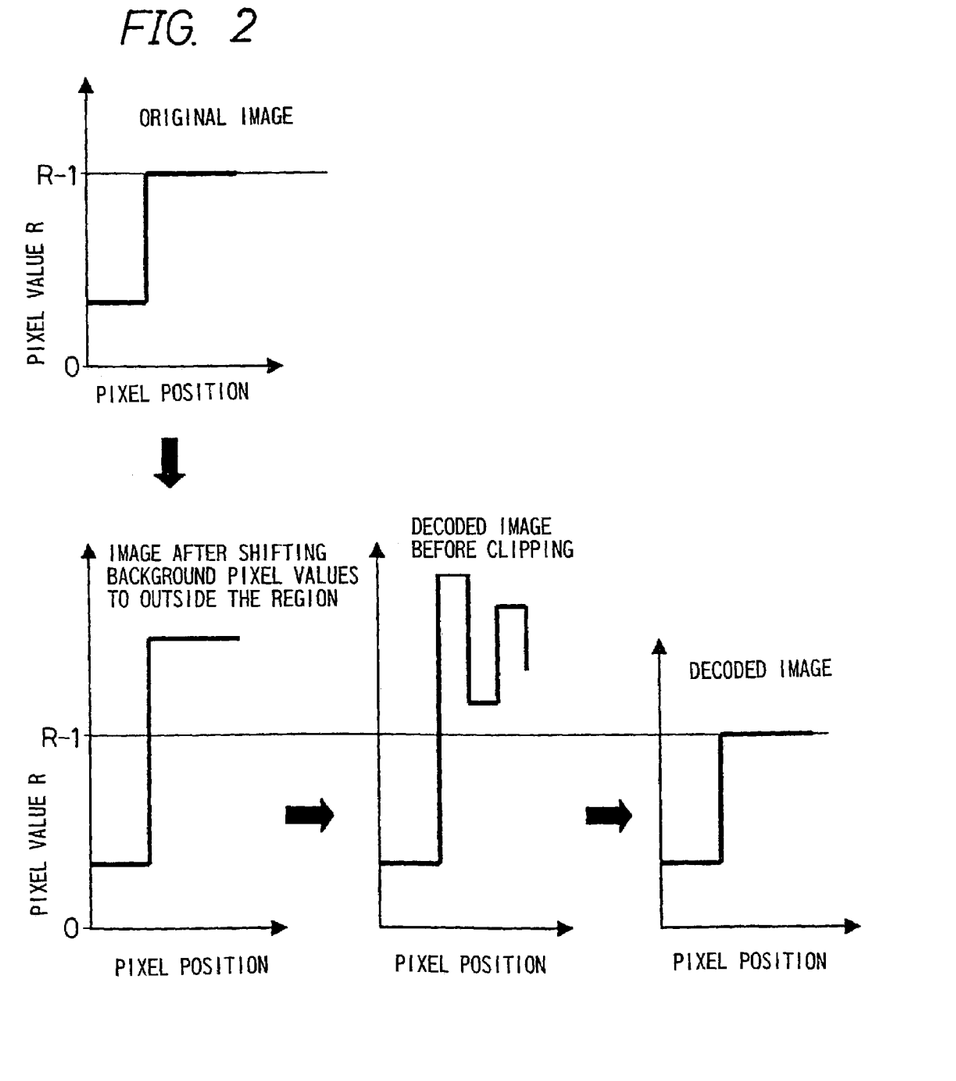
FIG. 2 is a view showing, in a case where an original image on a white (pixel value R) background has a step-like edge and noises are occurring near the edge in a decoded image, how the noises having the pixel values equal to or greater than R are shifted to R−1 through clipping.

FIG. 2 is a view showing, in a case where an original image on a white (pixel value R) background has a step-like edge and noises are occurring near the edge in a decoded image, how the noises having the pixel values equal to or greater than R are shifted to R−1 through clipping. Such clipping processing eventually makes only the noises having the pixel values equal to or lower than R−1 visible. Most of the noises on the background having the pixel values outside the grayscale range before the coding are eliminated through clipping as shown in FIG. 2 when the grayscale width used to shift the background is larger than the grayscale width of the noise occurring due to the coding.

The reason why a transmitting color is set to the boundary value of the grayscale is as follows. That is, the file formats enabling the transmitting color function are limited to those of the reversible coding methods having a low compression rate, such as GIF and PNG. Meanwhile, because the value is changed through irreversible conversion coding having a high compression rate, such as JPEG, a portion of a color other than the transmitting color turns to the transmitting color, or conversely, a portion of the transmitting color turns to a color other than the transmitting color, which results in a dot-like missing display spot called a "void" on the object 23, or a dot-like extra display portion called a "dirt" in the surroundings of the object 23, and the image quality of the composite image is thus deteriorated.

Hence, advantage is taken of the characteristic that all the values outside the grayscale range are returned to the boundary value through clipping, in other words, by specifying the boundary value of the grayscale as the transmitting color and shifting this value to outside the grayscale range before the coding, it becomes possible to achieve the transmitting color function through irreversible conversion coding without deteriorating the image quality of the composite image. A color specified as the transmitting color is either 0 (black) or R−1 (white) or both.

Figure 3:
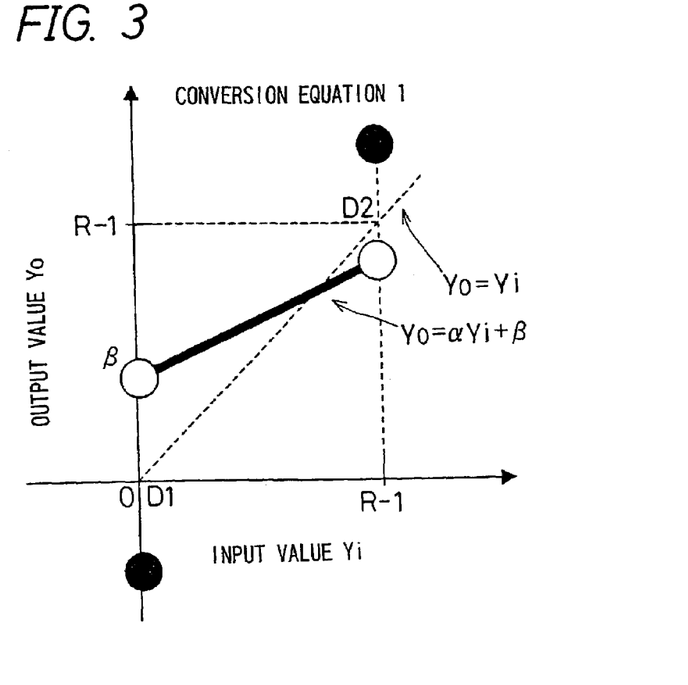
FIG. 3 is a view used to explain a first conversion equation set in a shift processing unit.
Figure 4:
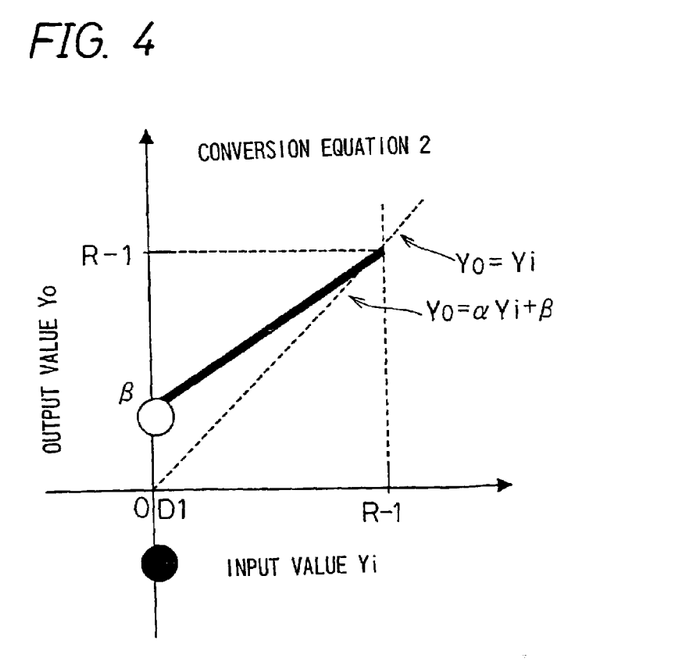
FIG. 4 is a view used to explain a second conversion equation set in the shift processing unit.
Figure 5:
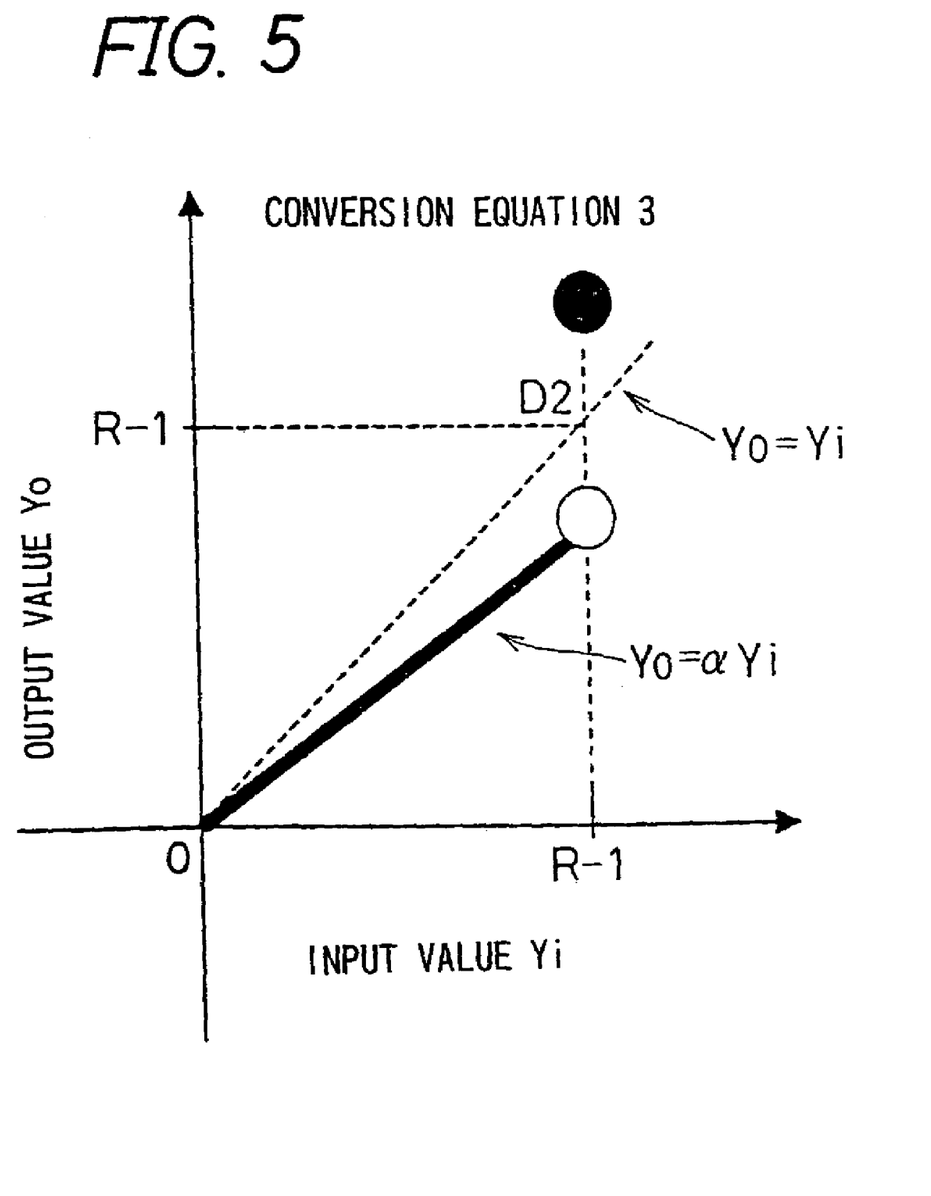
FIG. 5 is a view used to explain a third conversion equation set in the shift processing unit.

FIG. 3 is a view used to explain a first conversion equation set in the shift processing unit 35, FIG. 4 is a view used to explain a second conversion equation set in the shift processing unit 35, and FIG. 5 is a view used to explain a third conversion equation set in the shift processing unit 35. The shift processing unit 35 is set with the conversion equations needed for the aforementioned shift processing. The conversion equations may take several forms, and conversion equations expressed by linear functions are set forth below as one example, where $Y_i$ is the luminance of an input image to the shift processing unit 35, $Y_o$ is the luminance of an output image from the shift processing unit 35, R is the number of grayscale (herein, R=256, which is a value for 8-bit data), and each of $\alpha$, $\beta$, $D_1$, and $D_2$ is 0 or a positive integer.

(a) First Conversion Equation $$Y_o = -D_1 (Y_i = 0) \qquad (1)$$

$$Y_o = \alpha Y_i + \beta (0 < Y_i < R-1) \qquad (2)$$

$$Y_o = R - 1 + D_2 (Y_i = R-1) \qquad (3)$$

(b) Second Conversion Equation $$Y_o = -D_1 (Y_i = 0) \qquad (4)$$

$$Y_o = \alpha Y_i + \beta (0 < Y_i \leq R-1) \qquad (5)$$

(c) Third Conversion Equation $$Yo = \alpha Yi \quad (0 \leq Yi < R-1) \quad (6)$$

$$Yo = R-1+D2 \quad (Yi = R-1) \quad (7)$$

The first conversion equation having Equations (1) through (3) uses both 0 and R−1 as the transmitting color. The second conversion equation having Equations (4) and (5) uses 0 as the transmitting color, and the third conversion equation having Equations (6) and (7) uses R−1 as the transmitting color. Each conversion equation is set in such a manner that the transmitting color is shifted to outside the grayscale range. The conditions for α and β in the first through third conversion equations are: $\alpha \leq 1$ and $\beta \geq 0$.

There is a possibility that a pixel within the object 23 turns into the transmitting color through the coding and the aforementioned dot-like missing display spot is produced within the object 23. In order to reduce the possibility of the occurrence of such a dot-like missing display spot, the grayscale values of pixels within the object 23 are set to values far from that of the transmitting color. These values far from that of the transmitting color take values farther from that of the transmitting color after the conversion through any of the first through third conversion equations by giving a smaller value to α and a larger value to β. In a case where pixels having the grayscale 0 or R−1, which is the grayscale of the transmitting color, are originally contained within the object 23, the occurrence of the dot-like missing display spot cannot be avoided by merely using the first through third conversion equations. Hence, in order to forestall such an inconvenience, the pre-processing is performed on the pixels within the object 23, so that the pixel value is changed from 0 to 1, for example.

The irreversible coding unit 36 collectively encodes all the components separated into the luminance and the color differences. Color conversion coding is used as the irreversible coding, and JPEG (Joint Photographic Coding Experts Group) and MPEG (Moving Picture Coding Experts Group) of the International Standards can be used. The conversion coding reduces information by separating an image into spatial components, followed by fine quantization for low-frequency components and rough quantization for high-frequency components. This is because the human eyes are not so sensitive to the high-frequency components that the image quality hardly deteriorates when the high-frequency components are made less accurate. It should be noted, however, that the less accurate high-frequency components generate high frequency noises.

The image data encoded in the image coding device 31 is stored first in an accumulation medium through a communication line or the like, then read out therefrom, and inputted into the image decoding device 32.

In the image decoding device 32, the decoding unit 37 decodes data encoded in the image coding device 31, and converts the encoded data into image data represented by luminance and color differences. In this instance, of the grayscales outside the range from 0 to R−1, those having negative values are returned to 0 and those having values equal to or greater than R are returned to R−1 by the decoding unit 37 through clipping.

The up-sampling unit 38 returns the resolution of the color differences to the original resolution, that is, to the resolution as high as that of luminance. As a method of the up-sampling, a method of copying a single pixel to four color-difference pixels, a method of effecting interpolation, etc. can be adopted when two color-difference pixels are assigned to four luminance pixels.

The transmitting color judging unit 39 judges a portion having the luminance 0 or R−1 as the transmitting color. In general, white or black specified as the transmitting color is colorless, and for this reason, the color-difference value is R/2 (128 when R=256), that is, an intermediate value of the grayscale. However, the color-difference value may take a value other than R/2 due to influences of noises caused by the sub-sampling and the irreversible coding, which may give a color to the transmitting color. In order to avoid such an inconvenience, the transmitting color judging unit 39 changes the color-difference value forcedly to R/2 when the luminance has the value specified as that of the transmitting color.

The color converting unit 40 converts a color space represented by the luminance and the color differences to a color space specific to the display device, which allows an image to be displayed. For example, an RGB color space is used when the display device is a display, and a CMYK color space is used when the display device is a printer.

Figure 6A:
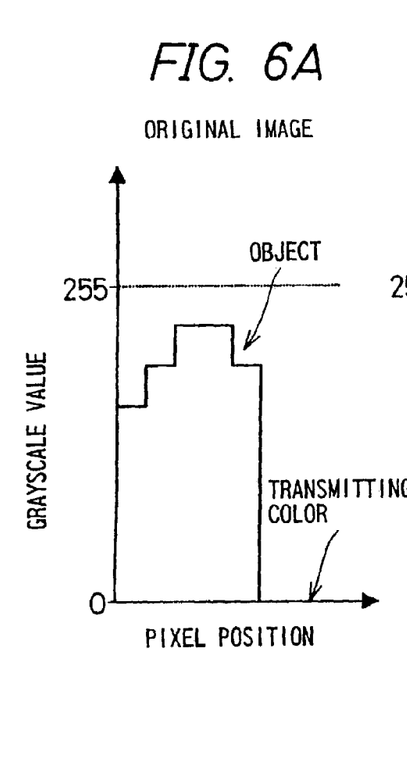
FIGS. 6A through 6D are views used to explain the principle based on which the image processing apparatus reduces noises in a transmitting color portion surrounding an object when 0 is given to a transmitting color.
Figure 6B:
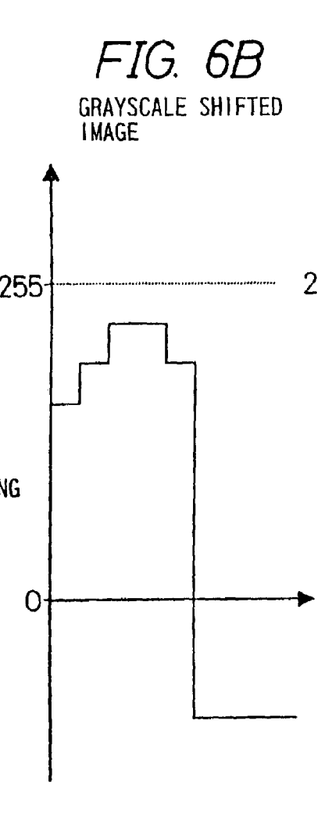

FIGS. 6A through 6D are views used to explain the principle based on which the image processing apparatus 30 reduces noises in a transmitting color portion surrounding the object when 0 is given to the transmitting color. In the drawings, the ordinate is used for the grayscale value and the abscissa is used for the pixel position on one line of an image. FIG. 6A shows an original image containing the transmitting color, and the grayscale of the transmitting color portion is shifted to a negative value by the shift processing unit 35 as shown in FIG. 6B.

Figure 6C:
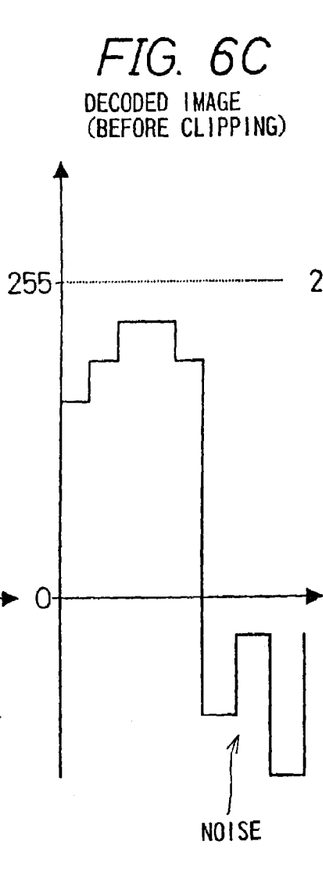
Figure 6D:
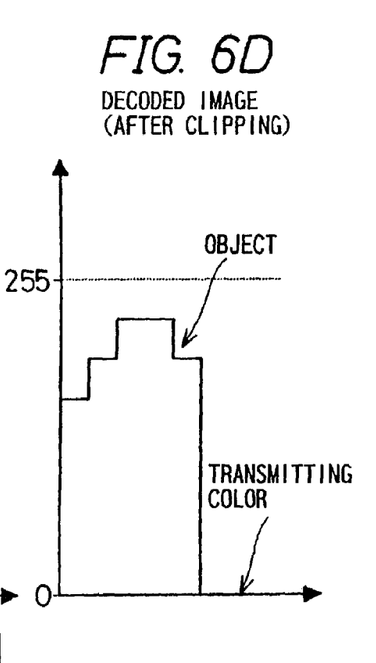

The image data encoded in the image coding device 31 is inputted into the image decoding device 32 through transmitting means 25 achieved by a communication line or an accumulation device, and decoded in the decoding unit 37. FIG. 6C shows the decoded luminance prior to the clipping, and noises in the transmitting color portion 21 are eliminated as shown in FIG. 6D through the clipping processing by which the grayscale is rounded off to the range from 0 to R−1. Although noises are left in the color-difference portions, noises caused from the color-difference components will not affect the transmitting color portion 21 because the transmitting color is judged based on the luminance components alone. An image of the background is composited with the transmitting color portion obtained in this manner.

As has been described, according to this embodiment, because noises in the transmitting color portion 21 can be suppressed, the object-based coding can be achieved through irreversible coding having a high compression rate without using a mask image separately. Also, because the mask composition processing is not needed, the arrangement of the device can be simpler, and hence the manufacturing costs can be saved. Further, because a standard image coding method used extensively in encoding a natural image can be adopted as the coding method regardless of whether a moving image or a still image is to be encoded. Hence, this embodiment can be implemented easily, and can be readily incorporated into various application programs.

The invention can be suitably applied to application programs handling a moving image and a still image, installed into the WWW browser, a color facsimile machine, a television telephone, and a cellular phone equipped with a display, etc.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image coding device comprising:
    grayscale shifting means for shifting a grayscale of luminance of a transmitting color of an original image; and
    image coding means for irreversibly encoding the image whose grayscale has been shifted by the grayscale shifting means,
    wherein the grayscale is represented by 0 to R−1,
    and the grayscale shifting means shifts the grayscale of luminance of the transmitting color of the original image which is 0 or R−1, to a negative value or a value equal to or greater than R.

2. The image coding device of claim 1, wherein the grayscale shifting means uses a value representing a darkest color of black as the grayscale of luminance of the transmitting color.

3. The image coding device of claim 1, wherein the grayscale shifting means uses a value representing a brightest color of white as the grayscale of luminance of the transmitting color.

4. The image decoding device comprising:
    image decoding means for decoding an encoded image; and
    transmitting color judging means for judging a transmitting color from luminance information of the image decoded in the image decoding means,
    wherein the grayscale is represented by 0 to R−1,
    and the image decoding means replaces, out of grayscales of luminance of the image decoded, a negative value or a value equal to or greater than R, with 0 or R−1.

5. The image decoding device of claim 4, wherein the transmitting color judging means uses a value representing a darkest color of black as a grayscale of luminance judged as being the transmitting color.

6. The image decoding device of claim 4, wherein the transmitting color judging means uses a value representing a brightest color of white as a grayscale of luminance judged as being the transmitting color.

7. The image decoding device of claim 4, wherein the image decoding means replaces, out of grayscales of luminance of the image decoded, grayscales outside a predetermined range, within the predetermined range.

8. An image processing apparatus comprising:
    grayscale shifting means for shifting a grayscale of a transmitting color of an original image;
    image coding means for irreversibly encoding the image whose grayscale has been shifted by the grayscale shifting means;
    image decoding means for decoding the image encoded by the image coding means; and
    transmitting color judging means for judging the transmitting color from luminance of the image decoded by the image decoding means,
    wherein the grayscale is represented by 0 to R−1,
    the grayscale shifting means shifts the grayscale of luminance of the transmitting color of the original image which is 0 or R−1, to a negative value or a value equal to or greater than R,
    and the image decoding means replaces, out of grayscales of luminance of the image decoded, a negative value or a value equal to or greater than R, with 0 or R−1.

9. The image processing apparatus of claim 8, wherein the grayscale shifting means uses a value representing a darkest color of black as the grayscale of luminance of the transmitting color, and the transmitting color judging means uses the value representing the darkest color of black as the grayscale of luminance judged as being the transmitting color.

10. The image processing apparatus of claim 8, wherein the grayscale shifting means uses a value representing a brightest color of white as the grayscale of luminance of the transmitting color, and the transmitting color judging means uses the value representing the brightest color of white as the grayscale of luminance judged as being the transmitting color.

11. The image processing apparatus of claim 8, wherein the transmitting color judging means uses only luminance in judging the transmitting color, and uses a value representing a darkest color of black as the grayscale of luminance judged as being the transmitting color.

12. The image processing apparatus of claim 8, wherein the transmitting color judging means uses only luminance in judging the transmitting color, and uses a value representing a brightest color of white as the grayscale of luminance judged as being the transmitting color.

13. The image processing apparatus of claim 8, wherein
    the grayscale shifting means shifts the grayscale of luminance of the transmitting color of the original image which exists within a predetermined range, to an outside thereof, and that the image decoding means replaces, out of grayscales of luminance of the image decoded, grayscales outside a predetermined range, within the predetermined range.

* * * * *